US007578143B2

(12) United States Patent
Critoph et al.

(10) Patent No.: US 7,578,143 B2
(45) Date of Patent: Aug. 25, 2009

(54) THERMAL COMPRESSIVE DEVICE

(75) Inventors: Robert Edward Critoph, Coventry (GB); Zacharie Tamainot-Telto, Coventry (GB)

(73) Assignee: University of Warwick, West Midlands (GB)

( * ) Notice: Subject to any disclaimer, the term of this patent is extended or adjusted under 35 U.S.C. 154(b) by 544 days.

(21) Appl. No.: 10/522,030

(22) PCT Filed: Jul. 25, 2003

(86) PCT No.: PCT/GB03/03176

§ 371 (c)(1),
(2), (4) Date: Jan. 21, 2005

(87) PCT Pub. No.: WO2004/011859

PCT Pub. Date: Feb. 5, 2004

(65) Prior Publication Data

US 2005/0252235 A1      Nov. 17, 2005

(30) Foreign Application Priority Data

Jul. 25, 2002    (GB) ................................. 0217332.6

(51) Int. Cl.
    *F25B 17/08*    (2006.01)
(52) U.S. Cl. ................. 62/480; 62/482; 62/484
(58) Field of Classification Search .......... 62/467,
    62/480, 112, 141, 142, 132, 147, 231, 232,
    62/476, 479, 495, 481, 482, 484
    See application file for complete search history.

(56) References Cited

U.S. PATENT DOCUMENTS 2,338,712 A    1/1944    Erland af Kleen 3,884,296 A * 5/1975 Basiulis ........................ 165/96

(Continued)

FOREIGN PATENT DOCUMENTS

DE      3604909      8/1987

(Continued)

OTHER PUBLICATIONS

Search Report dated Jan. 15, 2003 for corresponding Application No. GB0217332.6, 1 pg.

(Continued)

*Primary Examiner*—Melvin Jones
(74) *Attorney, Agent, or Firm*—Shumaker & Sieffert P.A.

(57) ABSTRACT

A thermal compressive device provides energy-efficient heating or cooling by exploiting heat regeneration in a sorption system. The device comprises an array of generator modules (7) arranged in two banks (10, 11) to either side of a heating zone (13). Heat carrier fluid is driven past the modules in a reversible direction. During one phase, generators in the first bank (10) are cooled and therefore in various stages of sorbate re-adsorption. Sorbate in associated evaporator region(s) (26) will boil, enabling cooling of surrounding fluid (33). Generators (7) in the other bank (11) will be in various stages of desorption. Sorbate in associated condenser region(s) (21) will condense, enabling heating of its environment. During the other phase, each generator (7) switches function, but cooling remains at evaporator regions (26) and heating at condenser regions (21). Each module may be a self-contained unit comprising generator (7), condenser (21) and evaporator (26) sections. In operation, the evaporator section (26) is arranged to be filled with condensed sorbate (28).

12 Claims, 8 Drawing Sheets

U.S. PATENT DOCUMENTS

| | | | |
|---|---|---|---|
| 4,183,734 A | 1/1980 | Leppard et al. | |
| 4,637,218 A | 1/1987 | Tchernev | |
| 4,694,659 A | 9/1987 | Shelton | |
| 4,924,676 A | 5/1990 | Maier-Laxhuber et al. | |
| 5,328,671 A | 7/1994 | Rockenfeller | |
| 5,404,728 A | 4/1995 | Maier-Laxhuber | |
| 5,526,653 A | 6/1996 | Cheng | |
| 5,881,573 A | 3/1999 | Ebbeson | |
| 6,213,197 B1 | 4/2001 | Ebbeson | |
| 6,415,627 B1 * | 7/2002 | Pfister et al. | 62/481 |

FOREIGN PATENT DOCUMENTS

| | | |
|---|---|---|
| DE | 4437950 | 4/1996 |
| DE | 19539105 | 4/1997 |
| FR | 744759 | 4/1933 |
| GB | 2 213 244 A | 8/1989 |
| SU | 1719814 A1 | 3/1992 |

OTHER PUBLICATIONS

Search Report dated Jun. 26, 2003 for corresponding Application No. GB0217332.6, 1 pg.

* cited by examiner

THERMAL COMPRESSIVE DEVICE

This application is a U.S. national filing of International Application No. PCT/GB2003/003176, filed Jul. 25, 2003, which claims priority to Great Britain Application No. GB 0217332.6, filed Jul. 25, 2002.

This invention relates to the field of heat-driven cooling devices, heat pumps or thermal transformers, in particular to those devices, known as sorption devices, which employ an ad- or absorbent material as a chemical compressor to raise the pressure of a refrigerant gas.

Heat pumps, thermal transformers and cooling systems are generally based on the thermodynamics of condensation and evaporation of a refrigerant gas. On condensation of a gas to a liquid, heat is rejected to the environment and on evaporation of a liquid, heat is absorbed. The evaporation/condensation cycle is driven by compression. If a selected environment is brought into thermal contact with the gas/liquid only during the evaporation phase, for example, then that environment experiences an overall cooling effect.

In conventional air conditioning units the necessary compression is driven by mechanical work that is normally provided by an electrical motor. By way of contrast, sorption devices (whether operated as heat pumps or cooling systems) are driven by the adsorption or absorption of the refrigerant gas (or sorbate), such as ammonia, by a solid or solid/liquid sorbent. The sorbent therefore acts as a chemical compressor.

In comparison with conventional air-conditioners, those based on a sorption cycle have the benefit that the energy needed to drive the system can be in the form of heat. A sorption heat pump or cooling system may be gas or oil fired or even solar powered. The use of primary heat energy as a driver, as opposed to a secondary source such as electricity, means that sorption devices inherently offer the potential to be more energy efficient and they may be operated independently of, or with significantly reduced reliance upon, the infrastructure of an electricity grid. With the substantial growth in demand for air conditioning units in warm developing countries such as China and India, the burden placed on the electricity supply is becoming critical. There is accordingly an increasing need to improve the energy efficiency of air-conditioning devices, and this is the potential offered by those based on a sorption cycle. Moreover, sorption systems benefit from a reduction in $CO_2$ emissions, with obvious environmental consequences.

In its simplest form a sorption device consists of a linked generator and receiver enclosing a sorbate gas. The receiver acts either as an evaporator or a condenser at different times. A sorbent material, such as active carbon, a zeolite or silica gel, is present in the generator. Initially, the whole assembly is at low temperature and pressure and the sorbent has adsorbed/absorbed a high concentration of sorbate. On heating the generator, the sorbate is driven out of its adsorbed phase, which in turn raises the pressure of the closed system. Under pressure, the sorbate condenses in the receiver and rejects heat to its environment. The generator is then cooled back to ambient temperature and the sorbate is readsorbed, which in turn reduces the system pressure. The reduced pressure in the receiver causes the liquid therein to boil. Heat, in this phase of the cycle therefore, is extracted from the environment to the receiver and so produces an external cooling/refrigeration effect.

If cooling, for example, is desired, it is apparent that the cycle described above is discontinuous since useful cooling occurs for only half the cycle. Two such systems operating out of phase however could theoretically provide continuous cooling. Moreover, a further improvement in efficiency can be made by arranging for regeneration of heat. That is, the heat rejected as the generator of one system is cooled is used to pre-heat the generator of the other.

There are a number of regenerative sorption devices described in the prior art. WO 96/09504 describes a sorption system in which a sorbent bed is heated and cooled by means of a circulating fluid. During the cooling phase, in which heat is extracted by the fluid, a degree of heat regeneration is provided by passing the heated fluid through a regenerative inert bed. The inert bed stores this heat until the subsequent heating phase in which it is used to preheat cooled circulating fluid. Two active/inert bed pairs can be operated with two fluid systems out of phase to provide continuous heating/cooling. This sorption system requires a high pressure pump in order to achieve the desired flow rate of fluid (ammonia) through the beds of active carbon. Such pumps are complex in design and the system overall is very bulky and difficult to adapt to accommodate other designs or to a smaller system.

WO 01/22010 describes a sorption system in which some of the problems of the above system are overcome. This sorption system is based on the use of pressurised tubes to provide individual sorption systems that can be used in modular fashion. Each tube contains a sorbate fluid and has thermally isolated generator, containing the sorbent material, and condensation/evaporation regions. The tubes are placed in a moving carousel arrangement, which allows for improved flow rate of heating/cooling fluid about the generator regions. Again heat is regenerated by using the heated fluid from cooling generators in their adsorption phase to preheat those generators entering the heating phase. This improves the efficiency of heating/cooling and the use of modular tubes increases design flexibility. It has proved problematic however to achieve efficient rotation of the tubes.

In U.S. Pat. No. 4,610,148 a regenerative heat pump using two beds of solid adsorbent is described. Heat transfer fluid is arranged to flow in a loop between heater, bed being heated, heat exchange cooler and bed being cooled. The cooling and heating cycles of respective beds are operated out of phase. On completion of each heating/cooling phase, fluid flow direction is reversed, both within the loop and in the direction it flows through each bed, and the beds enter the other phase of their cycle. Bed structure and composition is arranged such that the temperature differential between heating (or cooling) fluid and the part of the bed at its original temperature is localised at a thermal wavefront. The wavefront moves across each bed heating (or cooling) it as this phase of the cycle progresses. An arrangement of check valves ensures that the sorbate fluid flows from the bed being heated, and therefore in its desorbing phase, to the condenser and from the evaporator to the bed being cooled in its adsorbing phase. The benefit of establishing a thermal wave is that it allows heat to be regenerated efficiently. That is, until the, say hot, thermal wave has traversed completely the bed being heated, the heat exchange fluid exits that bed at a temperature near to the original (cool) bed temperature. It thus requires minimal cooling by the cooling heat exchanger before being cycled through the other (cooling) bed where a cold thermal wave has been established. Similarly the heat exchange fluid exits the cooling bed at a temperature near to the original (hot) bed temperature, and so requires minimal heating before being pumped through the heating bed. Fluid flow direction is reversed when the thermal waves almost reach the exit ends of the beds. In this way the amount of heat that is rejected by the heat exchanger and added by the heater is minimised and so the efficiency of the system is enhanced.

Working examples of this system have been built, although they have not achieved economic success. The heat exchangers and pressure vessels of this system require special design and manufacturing costs have proven prohibitively high.

All these prior art devices provide some degree of heat regeneration, and so have improved efficiency in comparison with non-regenerative devices. However there is a perceived need to provide a more energy efficient and less expensive sorption device, which may also offer the potential for adaptation to different systems and applications.

In a first aspect, the present invention provides a sorption module comprising a generator section connected via a first passage to a condenser section. The module contains a sorbent material within its generator section and a quantity of sorbate fluid and is characterised in that the condenser section is connected by a second passage to an evaporator section and the quantity of sorbate fluid and pressure within the module is such that, when the sorbent material is saturated with adsorbed or absorbed sorbate and at its lowest anticipated operating temperature, the evaporator section is substantially, and ideally completely, filled with sorbate liquid. The generator, condenser and evaporator sections are arranged or interlinked such that liquid in the condenser section is encouraged to flow to the evaporator section and discouraged from flowing to the generator section.

This design of sorption module lends itself to more flexibility in the design of sorption devices in which it may be incorporated and improved energy efficiency, in comparison with the sorption tubes described in WO 01/22010. As will be apparent to one skilled in the art, the sorption modules of this invention may readily be incorporated in devices such as that disclosed in WO 01/22010. By having physically separate evaporator and condenser sections, physically separate environments will be cooled or heated. This obviates the need either to move the modules between the environments to be heated or cooled or to direct heat transfer fluid from each environment to different sections at different times. This substantially simplifies any design of sorption device. Moreover, retention of liquid sorbent in the evaporator ensures that it is kept at a lower (relative to the condenser) temperature and that only evaporation of the liquid, and its desired heat extraction, can occur within. This avoids the degree of thermal cycling experienced by the joint evaporator/condenser of the prior art. Such cycling is energetically wasteful. A sorption module designed in accordance with this invention thus combines the advantages of sorption tubes with those of conventional refrigeration or air conditioning systems. In these latter systems, condenser and evaporator units are generally separated and condensed fluid flows from one to the other via an expansion valve.

In a preferred arrangement the evaporator section is located below the condenser section and the second passage is accordingly a downwardly extending passage. In this way the force required to encourage liquid condensate flow in a preferred direction is provided by gravity. Alternative forces may be capillary action via a wick, as used in conventional heat pipes, or centrifugal force if the module were to be rotated. In principle, any form of pump could be used, although the arrangement making use of gravity has the advantage of simplicity. Similarly back flow of liquid from the condenser to the generator is discouraged by gravity if the generator section is located above the condenser section.

It is preferred that the first and second passages comprise adiabatic sections. These serve to provide a thermal break between regions of the module that it is desired to be held at different temperatures. The need to keep the evaporator section filled with liquid and so ensure that evaporation can only take place within was described above. This consideration, at the lowest anticipated sorbent operating temperature (and hence smallest volume of condensed liquid), dictates the size of the evaporator section. During the heating and cooling cycle however, the sorbent is rarely at its lowest temperature and more than enough liquid to fill the evaporator section flows towards it. The second passage therefore serves to store the excess condensed liquid. The length of the second passage must be sufficient to ensure that when the condensed liquid is at its highest level (at the highest sorbent operating temperature), enough of the passage remains empty of liquid to provide the thermal break.

The generator section preferably has an internal arrangement of heat-conducting fins with one or more voids therebetween, the voids being sufficient to permit gas transport to and from the sorbent. The generator, condenser and/or evaporator sections may have a surrounding arrangement of heat-conducting fins. Such fins improve heat transfer and hence the efficiency of the sorption cycle.

If a solid sorbent material is used then this may be advantageously packed between the internal fins. This effectively holds the sorbent in the generator section, from which it would otherwise be liable to fall under action of gravity when the modules are arranged in an upright orientation. Alternatively, if the sorbent material is liquid then it is preferred that the first passage extends upwardly within the sorbent tube, its opening being located above the uppermost level of liquid sorbent. This similarly prevents the liquid sorbent from leaving the generator under the action of gravity.

The sorbent material is preferably chosen from one of the group of active carbons, zeolites, silica gels, metal halides, metal alloys, water or a combination thereof. These are commonly used and available sorbent materials. The sorbate fluid is not critical, provided that it is adsorbed or absorbed by the selected sorbent. The sorbate/sorbent system chosen depends on required operating parameters. The pressure of the system determines the temperature at which the sorbate will condense, and use of, for example, the carbon/ammonia system requires a high pressure system for operation at a standard ambient temperature. However the sorbate fluid is preferably chosen from one of the group of ammonia, water, alcohols, hydrogen, hydrocarbons, hydrofluorocarbons and carbon dioxide. If carbon dioxide is used it may not reach its critical pressure in the desorption phase. In this case, the "condenser" only cools the sorbate and does not condense it to a liquid. Although reference herein will be made to a condenser and sorbate condensation, it is to be understood that this is for convenience only. Apparatus designed in accordance with this invention could, as will be apparent to one skilled in the art, readily be operable with non-condensing carbon dioxide as the sorbate. Water, if the operating environment is suitable, is most preferable as a sorbate material because of its non-hazardous nature.

The sorption module may further include a porous plug of inert material within the second passage in order to help prevent backward splashing of liquid sorbate. Further, if the plug material is selected to have appropriate thermal mass and structure, it may provide another route for heat regeneration and so increase the efficiency of the cycle. Evaporated sorbate passing through the plug will cool it and this temperature reduction may in turn be passed on to condensed sorbate in a following phase.

In a second aspect, the present invention provides a thermal compressive device comprising:

a plurality of generator modules arrayed in two banks within a duct, each generator module containing a sorbent material and a sorbate fluid;

a heat exchange system in fluid communication with the generator modules wherein the sorbate fluid is arranged to evaporate and/or condense;

a heating zone located intermediate the two banks of generator modules; and reversible fluid driving means arranged to drive a heat carrier fluid along the duct across the generators within one bank, through the heating zone and across the generators within the other bank and vice versa.

There are a number of differences between this aspect of the present invention and the sorption device described in U.S. Pat. No. 4,610,148. First, the driving fluid which heats and cools the generators does not flow in a closed loop but is open. This offers the possibility of using ambient air as the driving fluid, which gets rid of all requirements for piping conduits and storage vessels. As a result, the system is of a simpler design and may potentially be more compact than those of the prior art. The above referenced prior art system necessarily uses a liquid heat transfer fluid. In many applications of a device such as this, the required output is either warmed or cooled air and the rejected heat must be dumped to the atmosphere. Often the source of heat to power the machine is in the form of heated air from combustion of a fuel. If air is used directly as the transfer fluid it obviates the need for secondary heat exchangers to transfer heat between ambient air (or heated air) and the heat transfer liquid. Secondly, the present design makes use of multiple isothermal beds of absorbent (one in each generator module) rather than two beds of absorbent with very high temperature gradients within. The prior art system requires the high temperature gradients in order to store energy in the beds for later regeneration. This is the means by which efficient operation is achieved. At the same time however it is desired that the sorbent material spanning the bed at the thermal wavefront is heated as rapidly as possible. These two conditions tend to place conflicting requirements (high conductivity transversely and low conductivity longitudinally) on the structure of a large block. By way of contrast, the design of this invention has inherently good heat transfer from the heat transfer fluid to and from the sorbent but low thermal conductivity between sorbent modules. This permits the formerly conflicting requirements to be readily met in a way that also results in a device of compact design and high efficiency.

Each generator module preferably has a central axis, the central axes of the generators being substantially aligned in a direction perpendicular to a plane occupied by the bank in which they are arrayed. This arrangement maximises heat transfer from the driving fluid to the generator modules.

It is preferred that each generator module has an internal arrangement of heat-conducting fins with one or more voids therebetween, sufficient to permit gas transport. It is further preferred that the sorbent material is solid and packed between the internal fins. Moreover, each generator module may also have an external arrangement of heat-conducting fins.

The generators and external fins within each bank of the device may be linked to form a series of fin-tube blocks, wherein each block comprises a series of laminar strips of heat-conducting material stacked about the generator modules, stacking direction being substantially parallel to the central axes of the generator modules, the modules being arranged in a row along a length of the stacked strips, such that each is surrounded by the heat conducting material which thereby forms the linked fins, and the fin-tube blocks within each bank are arranged such that they present successive rows of generator modules to the heat carrier fluid when it is driven along the duct.

This arrangement maximises the efficiency of the system. As the fluid is driven across the array a thermal wave is set up. The thermal wave is in the form of a temperature front which moves across the generator array in the direction of the driving fluid. Hence, when the driving fluid is hotter than the array, there is a drop in temperature at the position of the front. Once the thermal wave breaks through at the far end of the array, which can be detected by a rapid rise or fall in the temperature of the emerging fluid, this is the point when the direction of flow of the fluid is most advantageously reversed. Each successive row of generator modules (referred to herein as a "block") takes perhaps only around 5% of heat from a hot driving fluid. It is therefore advantageous to have a number of rows in the array matrix to make maximum use of potential heat transfer.

The generator modules within each block are placed in good thermal contact by the linked fins. The fins improve the take up of heat from/to the driving fluid and serve to distribute the resulting temperature change evenly along the block.

The heating zone preferably contains a heat source extending across the duct for a distance approximately equal to that for which the banks extend across the duct. Depending on the application, the heat source may be exhaust heat, which would otherwise be wasted, or solar heat. These can be implemented in highly efficient systems.

The heat exchange system may comprise at least one condenser or cooler connected via an expansion valve to an associated evaporator. This is a relatively conventional and proven arrangement for the evaporator/condenser system of refrigerators, air conditioners and the like. Each generator module in this preferred embodiment has a connecting passage; and each bank of generator modules is connected from the generator connecting passages first to the condenser or cooler via a respective one-way outlet valve or a respective assembly of one-way outlet valves, the one-way outlet valves allowing fluid flow from the generator modules to the condenser or cooler, and secondly to the evaporator via a respective one-way inlet valve or a respective assembly of one-way inlet valves, the one-way inlet valves allowing fluid flow from the evaporator to the generator modules.

The connecting passages of all generator modules in each respective bank may be interconnected to form a single channel with first and second branches, the first branch being connected via the single outlet valve to the condenser or cooler and the second branch being connected via the single inlet valve to the evaporator. This embodiment of the invention has the advantage that it minimises the number of valves used with the conventional heat exchanger. This reduced the cost and complexity of the device and, since the valves tend to be more prone to failure than other components, improves its reliability.

Alternatively, the connecting passages of all generator modules in a single fin-tube block are interconnected to form a single channel with first and second branches, all fin-tube blocks in a respective bank thereby having an assembly of such channels, each channel having its first branch connected to the condenser or cooler via a respective one of the assembly of outlet valves and its second branch connected to the evaporator via a respective one of the assembly of inlet valves.

In considering an array of generator modules, heat conduction between modules in the direction of the driving fluid is to be avoided, whereas it can be advantageous in a direction perpendicular to the driving fluid. The former condition is desirable because it enables establishment of a steep thermal wave, which allows more heat to be regenerated. Although its primary advantage is in enhancing thermal transfer between the driving fluid and the generator modules, the external fin structure used in this embodiment of the invention also permits efficient thermal conduction of heat between the generators in the block. This means that they will all be substantially at the same (or thereabouts) temperature. As the thermal wave progresses however generators in different blocks will be at different temperatures. Thus it is to be expected that, for example, in the desorbing phase, those nearest to the heat source will reach the pressure required to activate the one-way valve first. It is therefore advantageous to, despite the added complexity, include one pair of inlet-outlet valves for each generator block. This results in a steadier output, and also a small increase in efficiency.

Each generator module connecting passage may alternatively be connected to the condenser or cooler via a respective one of the assembly of outlet valves and to the evaporator via a respective one of the assembly of inlet valves.

In alternative embodiments, each generator module may be a component of a sealed sorption unit, the sorption unit also comprising a condenser/evaporator module and a first connecting passage, by which means the condenser/evaporator module is in fluid communication with the generator module, and wherein the sorption units are oriented such that the condenser/evaporator modules are arrayed in two banks, corresponding to those of the generator modules, located outside of and below the duct.

This represents an improvement over the prior art of U.S. Pat. No. 4,610,148 as it obviates the need for one-way or expansion valves. The generator and condenser/evaporation modules may both have fins and, as before, be linked into blocks.

It is most preferred that each generator module is a component of a sealed sorption module, the sorption module being in accordance with the first aspect of this invention.

The thermal compressive device of this invention may be incorporated in an air conditioning system, a refrigerator, a heat pump or a thermal transformer.

Embodiments of the invention will now be described by way of example only and with reference to the accompanying drawings.

Figure 1:
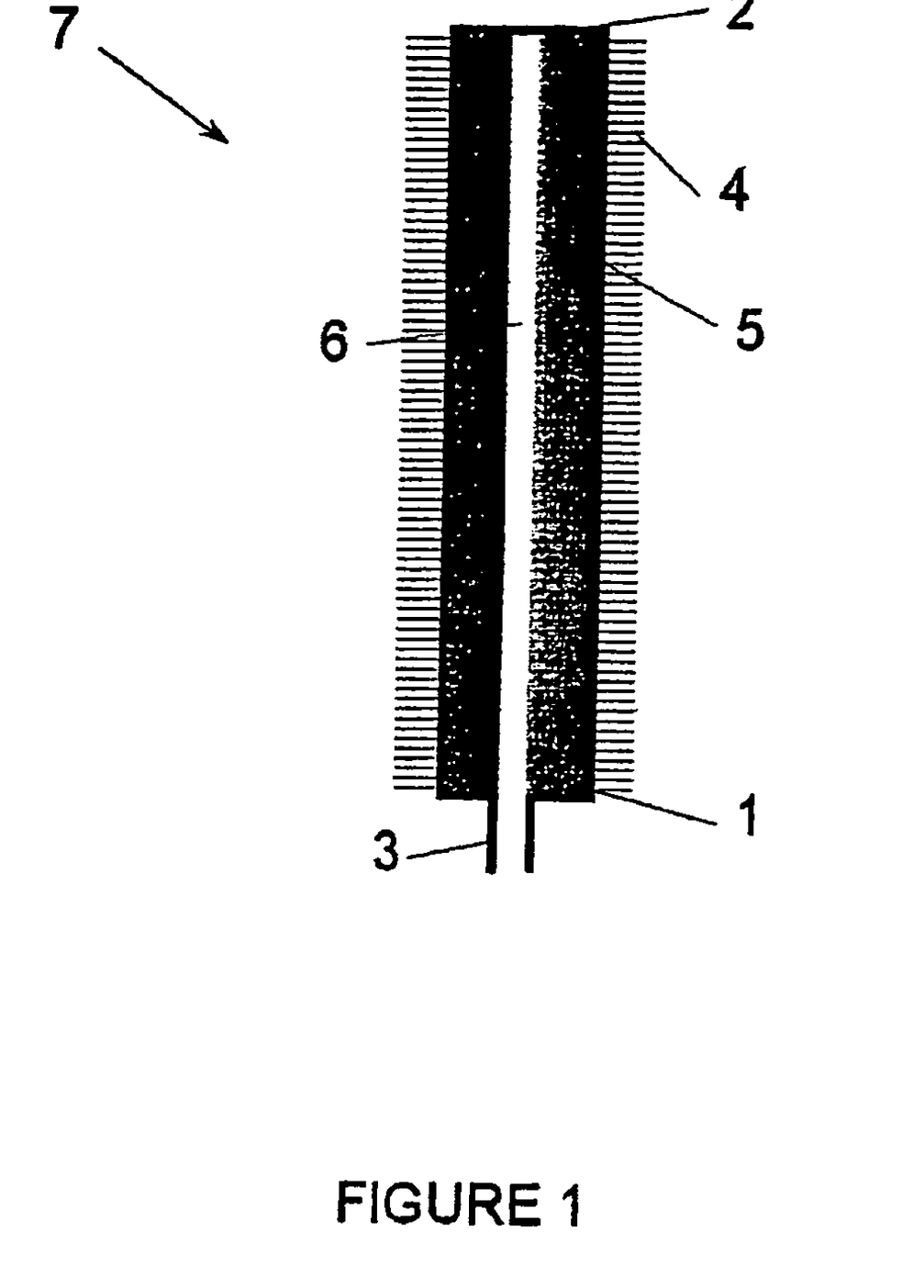
FIG. 1 is a schematic illustration of a generator module for use in sorption tubes and with sorption devices of this invention.

With reference to FIG. 1, there is shown a generator module for use in a sorption tube. The module comprises a sorbent material 1 held within a container 2 having one or more passages 3 for connection to a condenser module or system (not shown). The sorbent 1 in this embodiment is solid although, as described later, liquid sorbents may also be used. Suitable sorbents are therefore, for example, active carbon, zeolite, silica gel, metal halides, metal alloys, water or combinations thereof. The module illustrated includes a series of fins 4, 5 arranged both internally 4 and externally 5 to the container as an aid to heat transfer. The sorbent 1 is packed against internal walls of the container 2 and between the internal fins 4. The sorbent 1/internal fin 4 arrangement does not extend completely across the container, but leaves a central cylindrical cavity 6. A refrigerant gas (sorbate) is present within the generator and in fluid communication, via the passage(s) 3, with the condenser module or system. The sorbate may be any substance that is absorbed or adsorbed by the sorbent, for example, ammonia, water, alcohols, hydrogen, hydrocarbons, fluorohydrocarbons, carbon dioxide, etc. It exists within the generator either in a gaseous state (in the cavity 6 or in voids between particles of sorbent) or in an adsorbed phase within the sorbent. The use of internal and/or external fins 4,5 or other mechanism for heat transfer enhancement serves to increase the rate of heat flow into and out of the generator module and hence the rate of sorbate sorption or desorption. Internal fins 5 may be arranged in horizontal planes as shown in FIG. 1, although other arrangements will also function effectively. For example, they may be arranged radially with their planes substantially parallel to a central axis of the generator. Neither need the cavity 6 be central, it is only required that one or more voids are left between the internal fins 5 to allow sorbate gas transport.

In operation, whether run to achieve cooling or heating, the generator is heated to desorb refrigerant at high pressure and temperature and subsequently cooled to adsorb or absorb low-pressure refrigerant gas.

As stated previously, it is advantageous to recover and re-use some of the heat rejected when the generator cools down in order to assist next or later heating phases. Heat regeneration increases the energy efficiency of sorption heat pump or cooling devices.

Figure 2:
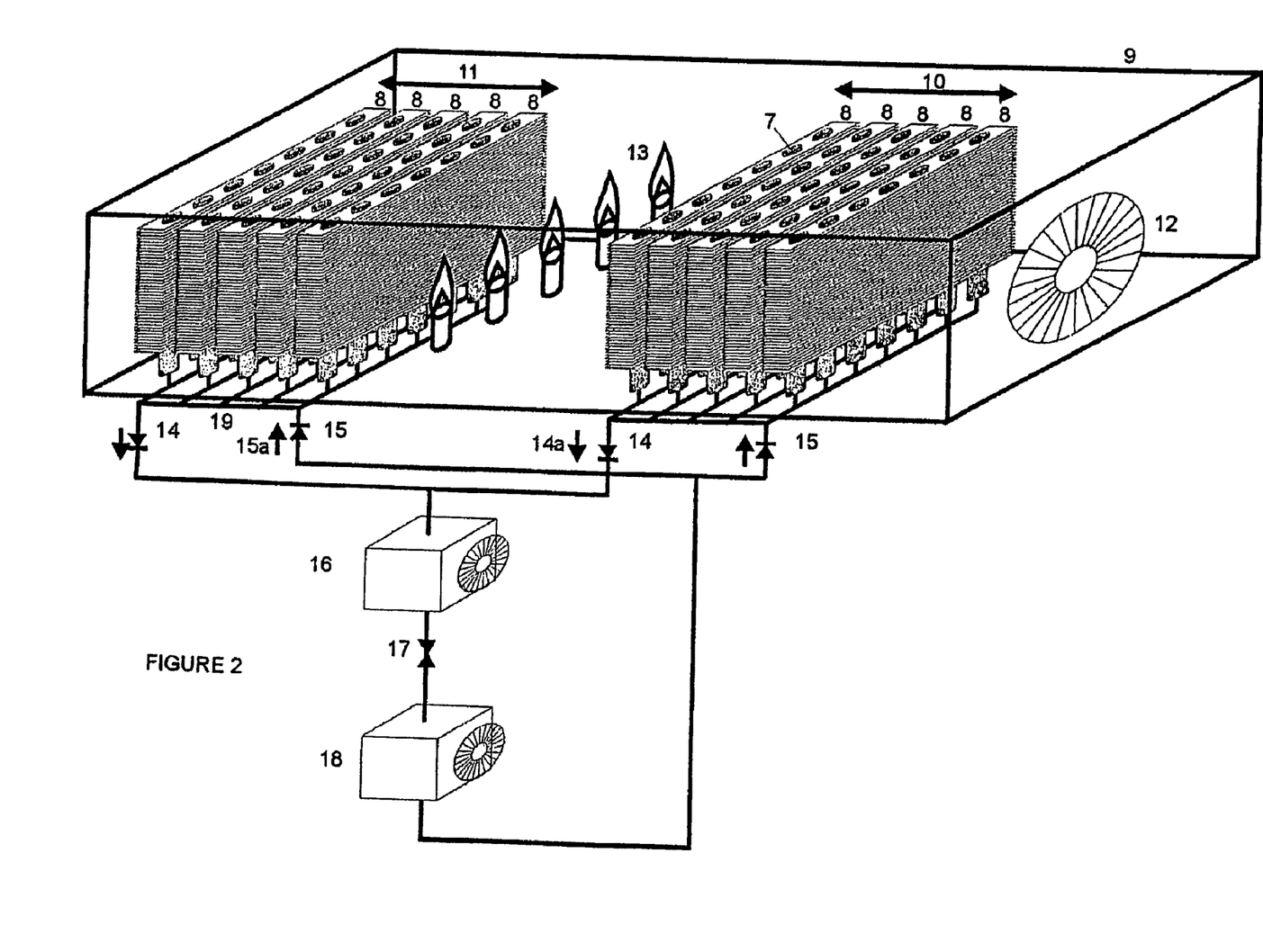
FIG. 2 illustrates schematically a first embodiment of a sorption device in accordance with this invention, the device including the generator modules of FIG. 1.

An embodiment of a heat pump/cooling device of the present invention which exhibits a novel means of heat regeneration is illustrated in FIG. 2. The device contains a number of generator modules 7 arranged in rows. Rather than being separated, as indicated with the single module shown in FIG. 1, the external fins 5 of each row of modules are joined in a longitudinal (along the row) direction to, together with the modules 7, define a series of fin-tube blocks 8. A plurality of such blocks 8 are assembled within a duct 9 into first 10 and second 11 separated zones, each zone comprising an array of generator modules 7. A reversible fan 12 is arranged to drive fluid within the duct 9 either from the first 10 to the second 11 zone or second 11 to first 10 zone. Between the two arrays 10, 11 is a heating zone 13. The reversible fan 12 may alternatively be a pump or other fluid moving device, provided that this can drive fluid movement in opposing directions. Alternatively it may comprise a plurality of non-reversible fluid moving devices arranged to provide the reversible drive-direction function. Positioning of the fan 12 within the duct 9 (at either end, or along its length) is also not critical, provided that the required functionality is achieved. The fluid may be ambient air or other gas or liquid heat transfer fluid. The heating zone 13 may employ direct combustion of a fuel to provide heat to the fluid, or alternatively, may employ a heat exchanger or direct mixing of the fluid with the high temperature exhaust of an engine. The ultimate heat source could be fuel combustion, solar energy or waste heat.

In the embodiment of a sorption device shown in FIG. 2, the passages 3 from each generator module 7 are connected via common one-way outlet 14 and inlet 15 valves to a heat exchange system. The heat exchange system comprises a condenser/cooler 16 connected via an expansion valve 17 to an evaporator 18. Two mutually thermally isolated carrier fluids flow through, and in thermal contact with, the condenser/cooler 16 and evaporator 18. The one-way valves 14, 15 allow flow in a direction indicated by arrows 14a, 15a when the upstream pressure exceeds the downstream pressure, but do not allow flow in the opposite direction. The valves 14, 15 may be automatic one-way valves or actuated valves which achieve the same effect. Outlet passage manifolds 19 from separate zones 10, 11 of generator arrays are each connected to one inlet 15 and one outlet 14 valve.

In order to illustrate operation of the device, consider an initial situation in which the fan 12 is and has been operating to drive ambient air (or other fluid) into the duct 9, through zone 11, through the heating zone 13, then through the zone 10 and finally out of the duct 9. The generators 7 in array zone 11 will therefore be at a temperature close to that of the ambient air. On the other hand, the generators in array zone 10 will be at a high temperature due to the effect of heat transfer from the fluid, which has been heated as ft passed through the heating zone 13. At a chosen time the fan 12 and hence fluid flow direction is reversed. Heat is then transferred from the high temperature generators 7 within the array 10 to the ambient temperature intake fluid. The fluid in duct 9 is thus pre-heated as the generators 7 in this array 10 are cooled. Accordingly, the amount of heat required to be transferred to the duct fluid within the heating zone 13 in order to raise its temperature to the required level is reduced. Once through the heating zone 13, the fully heated fluid passes through the generators 7 in array 11 and transfers its heat to them. After another chosen time interval, the generators 7 in array 11 reach their required temperature level and the fan 12 and flow direction are again reversed. Generators in array 11 are then cooled as those in array 10 are heated, preheating the duct fluid prior to its passage through the heating zone 13, as before. It is accordingly possible to heat alternately the generators 7 in arrays 10 and 11, recovering some of the heat from the array that is cooling and using it to assist in the heating of the other array. If there are sufficient blocks 8 in each array 10, 11, the recovery of heat can be very significant. Heat transfer becomes analogous to that in a packed bed heat exchanger, such as disclosed in WO 96/09504 in which the effectiveness of heat regeneration can exceed 80%.

Returning to the initial phase of operation described above, it is apparent that with the generators in zone 10 being heated to high temperature, the sorbate within will be driven from its adsorbed phase. As the sorbate is desorbed, the pressure within the zone 10 generators rises. As soon as this pressure exceeds the pressure in the refrigerant condenser/cooler 16, outlet valve 14 in the connection to the zone 10 manifold 19 opens and the sorbate passes into the condenser/cooler 16, where it cools. If the sorbate is a condensable refrigerant such as ammonia, water or a hydrocarbon, the sorbate/refrigerant will condense to a liquid within the condenser 16 and reject heat into its environment. This rejected heat can be used to heat the carrier fluid passing through, and in thermal contact with, the condenser 16. A sorbate (refrigerant) such as carbon dioxide would not necessarily condense to a liquid but, away from the vicinity of the heated generators 10, would still be cooled. The condensed or cooled sorbate then flows from the condenser/cooler 16 through the expansion valve 17 to the evaporator 18. The expansion valve 17 is of conventional type, known to reduce the pressure of the sorbate as it passes through. In the evaporator 18 therefore, the condensed sorbate boils and in so doing, extracts heat from the carrier fluid passing through, and in thermal contact with, the evaporator 18. If the sorbate is carbon dioxide, it flows into the expansion valve as a supercritical fluid. This fluid then returns to a gaseous phase when the pressure is reduced, similarly extracting heat from the carrier fluid. The evaporator 18 is connected via the one-way inlet valves 15 back to the generator passage manifolds 19. The low-pressure sorbate gas leaving the evaporator 18 will therefore flow through one of the inlet valves 15 to the manifolds 19. The generators 7 within zone 11, having been cooled by the heat transfer fluid flow, are at a slightly lower pressure still, and so the sorbate gas is re-absorbed or adsorbed by the sorbent within these zone 11 generators.

If the device shown in FIG. 2 is operated as a cooling device, then the cooling experienced by carrier fluid within the evaporator 18 represents the useful output of the whole system. If the arrangement is operated as a heat pump the low grade heat taken up by the evaporator becomes upgraded to a higher temperature and is output both from the condenser and exit of the duct 9.

It can be seen that, in this embodiment of the invention, whichever the direction of operation of the fan 12 and hence fluid flow through the duct 9, desorbed sorbate will flow from one or other (whichever is hotter) generator array 10, 11, though its associated outlet valve 14 to the condenser/cooler 16 and thereafter to the evaporator 18. Sorbate is then returned via the associated inlet valve 15 to whichever generator array 10, 11 is cooler. This will be the array 10, 11 from which it was not initially desorbed. In both phases of operation therefore, cooling can be achieved at the evaporator 18.

Optionally, the apparatus of FIG. 2 also includes a conventional "suction-line heat exchanger" (not shown) extending between the evaporator 18 and condenser 16 exit, above the expansion valve 17. Sorbate gas leaving the evaporator 18 and sorbate liquid leaving the condenser 16 are passed along the heat exchanger, the gas therefore providing further cooling of the liquid. This increases the cooling effect of the liquid once it reaches the evaporator 18.

Figure 3:
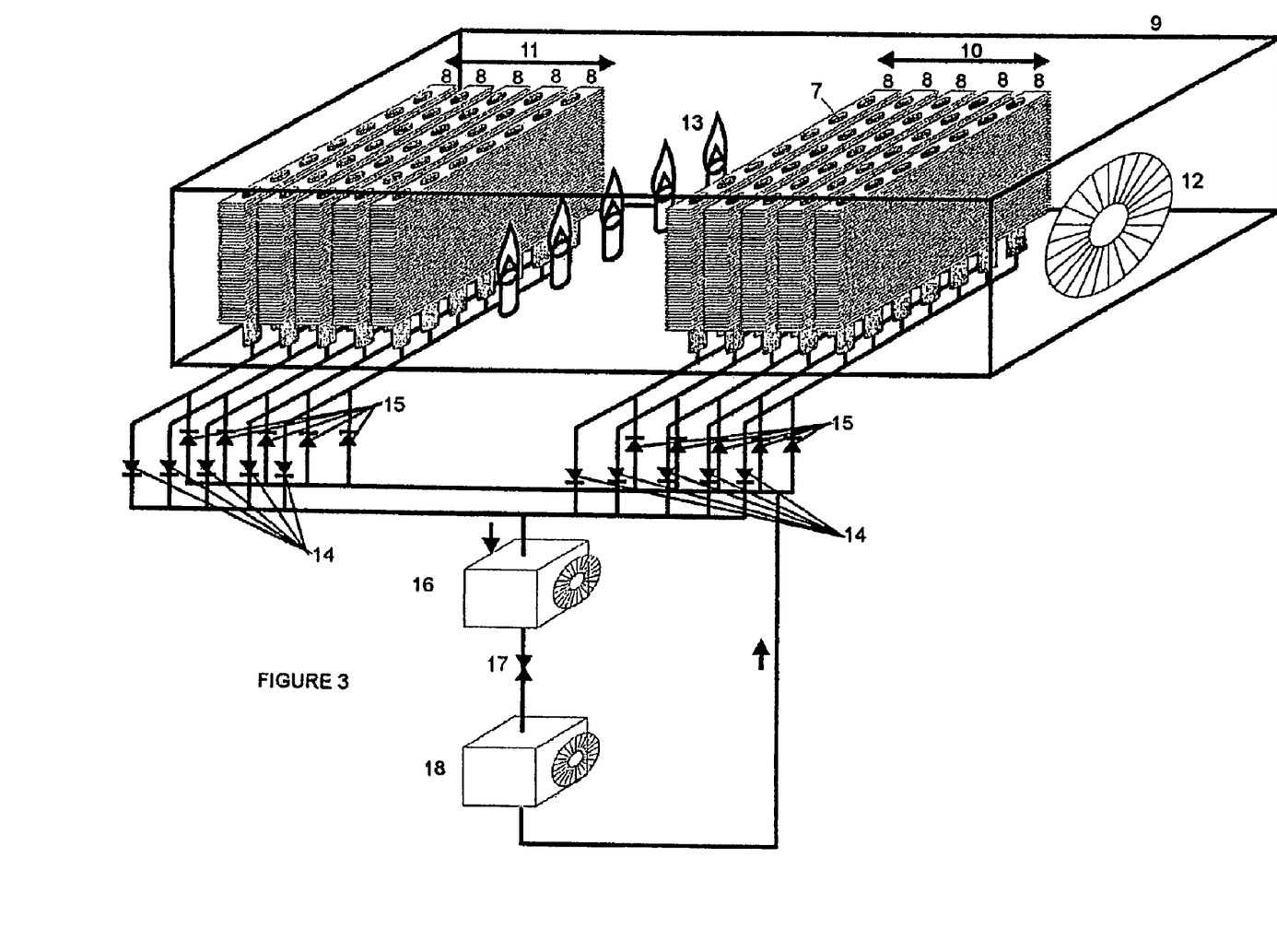
FIG. 3 illustrates a second embodiment of a sorption device according to this invention, the device again including the generator modules of FIG. 1.

Referring now to FIG. 3, there is shown an alternative embodiment of the sorption device of this invention which includes the generator modules 7 of FIG. 1. In this Figure components which are common to the FIG. 2 embodiment are indicated with the same reference number. The apparatus again includes two arrays 10, 11 of generator modules 7, the modules 7 and external fins 15 being arranged in rows to define a series of fin-tube blocks 8. The reversible fan 12 is arranged to drive fluid through the duct 9 such that it flows through the first array 10, perpendicular to the blocks 8, through the heating zone 13 and then through the second array 11 or vice versa, depending on direction of operation of the fan 12. The generator modules are connected via one-way output valves 14 to the condenser/cooler 16 end of the heat exchanger system and via one-way input valves 15 to the evaporator 18 component of the heat exchanger system. This embodiment differs from that shown in FIG. 2 in the manner in which the generators 7 and heat exchange system are connected.

The previously described embodiment of the sorption device of the invention has all the generator passages 3 in each array 10, 11 connected together to form two distinct manifolds 19. Each manifold has a single input 15 and output 14 valve associated with it. In this embodiment however only the generators 7 within each block 8 are connected together via passages 3 to single inlet 15 and outlet 14 valves. That is, each block 8 has its own pair of inlet 15 and outlet 14 valves. Despite this extra complexity, this embodiment results in a steadier output in terms of cooling power.

To illustrate the advantageous cooling output, consider the generators 7 (of both the FIG. 2 and FIG. 3 arrangements) in a situation in which the fan 12 has been driving the fluid from the first array 10 through the heating zone 13 to the second array 11 and is about to be switched. Just after switching, the generators 7 within each array 10, 11 are not heated or cooled at the same rate, and nor are they at the same temperature. Rather, heating and cooling depends on the relative position of the block 8 in which a generator 7 is located to the heating zone 13. Immediately after switching, such that the ambient air now flows from array 11 to array 10, those generators 7 in the block 8 of array 11 nearest to the intake point (left hand side in the figure) of the ambient air will be cooled fastest. Successive blocks 8, moving across the array 11 towards the heat source, will be cooled at slower rates, as the ambient air reaching them will have been pre-heated to a degree by previous generators. Similarly, those generators 7 in the block 8 of array 10 nearest to the heating zone 13 will be heated fastest. Those nearest the fan 12 (in this figure) will be heated slowest. Thus a cooling/heating wave front can be considered to move across the blocks 8 in the direction of fluid flow.

The advantage provided by the FIG. 3 embodiment in comparison with that shown in FIG. 2 relates to the time taken for the heated array 10 to start sending desorbed gas to the condenser 16, and consequently the evaporator 18. When either arrangement of generators 7 is heated two sequential processes occur. As soon as the temperature increases, sorbate is desorbed. At the start of a heating phase, the pressure within the assembly of modules is below that of the condenser. Accordingly, the desorbed gas stays within the generator assembly but increases the sorbate pressure within. Only when the pressure exceeds that of the condenser does the outlet check valve 14 open and sorbate flow to the condenser 16. Thereafter the pressure within the generator assembly remains substantially constant as further desorbed sorbate gas flows to the condenser 16 and condenses. In the FIG. 2 embodiment all generator modules 7 in one array 10, 11 are manifolded together. The pressure in the whole array must therefore reach that of the condenser before the outlet valve 14 opens. Essentially the gas leaving the generator blocks 8 that are heated first flows into other, cooler, blocks within that array until the whole array is pressurised. By way of contrast, each block 8 of generators 7 in the FIG. 3 embodiment is self-contained and each has its own outlet check valve 14. The blocks 8 within the array 10 may therefore be at different pressures during the pressurisation phase. The block 8 located closest to the heating zone 13 thus reaches the condensing pressure first and, at this point, its associated outlet valve 14 opens and so allows sorbate to flow to the condenser 16. This point is reached far sooner in the heating cycle than the stage at which sorbate first passes to the condenser 16 in the embodiment of FIG. 2. Outlet check valves 14 associated with other blocks 8 open progressively across the array 10 as the pressure within the respective generators 7 reaches the required level.

Similar reasoning applies to the cooling array 11. The input check valve(s) 14 will open when sufficient sorbate has been absorbed for the pressure in the generators 7 to be reduced to that in the evaporator 18. Consequently, the FIG. 3 embodiment will exhibit a progressive opening of inlet check valves 14 across the array 11, and sorbate will begin to flow from the evaporator 18 at an earlier point in the cycle.

The net result is that there is a steadier flow of refrigerant sorbate into and out of the condenser 16 and evaporator 18 in the embodiment of the invention shown in FIG. 3. As a consequence, this embodiment provides steadier heating and cooling powers. Moreover, the time taken in switching between the adsorption and desorption phases, during which period the evaporator 18 and condenser 16 do not operate, is reduced. If hot gas from one block 8 enters a cooler block to which it is manifolded (as in FIG. 2) then there is an increase in the entropy generated by the process. Elimination of this in the FIG. 3 embodiment therefore additionally permits a small increase in efficiency to be obtained.

In a third embodiment of this sorption device, not shown, it is of course possible to connect each individual generator 7 in the arrays 10, 11 to its own pair of input 15 and output 14 check valves. In the preferred embodiments shown herein however, in which each generator block 8 is intra-linked by heat conductive fins, it is not thought that there will be sufficient temperature gradient within a single block 8 to justify the added complexity.

Figure 4:
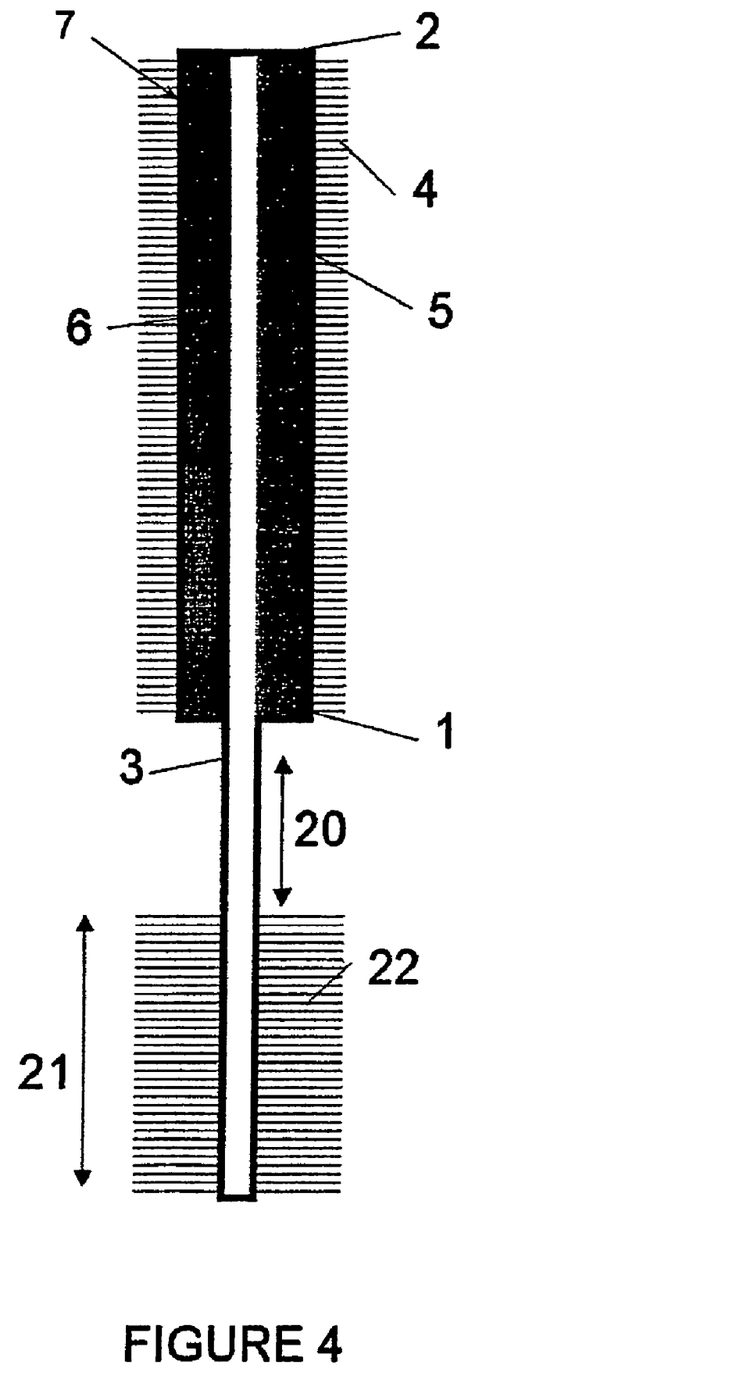
FIG. 4 illustrates a sorption tube incorporating the generator module of FIG. 1.

In FIG. 4 there is shown a sorption tube for use with further embodiments of the sorption device of this invention. This sorption tube incorporates the generator module 7 of FIG. 1, and common components are like-referenced. In this embodiment, the generator output passage 3 is connected via an adiabatic section 20 to a combined evaporator and condenser region 21. Fins 22 are also included in this combined region 21 to enhance heat transfer to a carrier fluid. The adiabatic section 20 is constructed to minimise thermal conduction between the generator module 7 and the evaporator/condenser region 21 i.e. to provide a thermal break.

The differing arrangement of apparatus incorporating this type of sorption tube will be described later but first it is helpful to consider sorbate flow within the tube as the generator temperature is cycled. As the generator module 7 is heated, sorbate is desorbed and condenses in region 21. Rejected heat is transported from region 21 by passing a thermally contacting carrier fluid over it. This heated fluid is rejected if the sorption tube is part of a cooler or collected as useful output if part of a heat pump. When this desorption phase is complete the generator module 7 is cooled. This results in a reduction of pressure inside the sorption tube and the sorbate boils in region 21, which now functions as an evaporator. Fluid in thermal contact with the region 21 and passing over it will now be cooled. Heated and cooled fluid flows can be diverted to environments requiring heating and cooling as desired.

Figure 5:
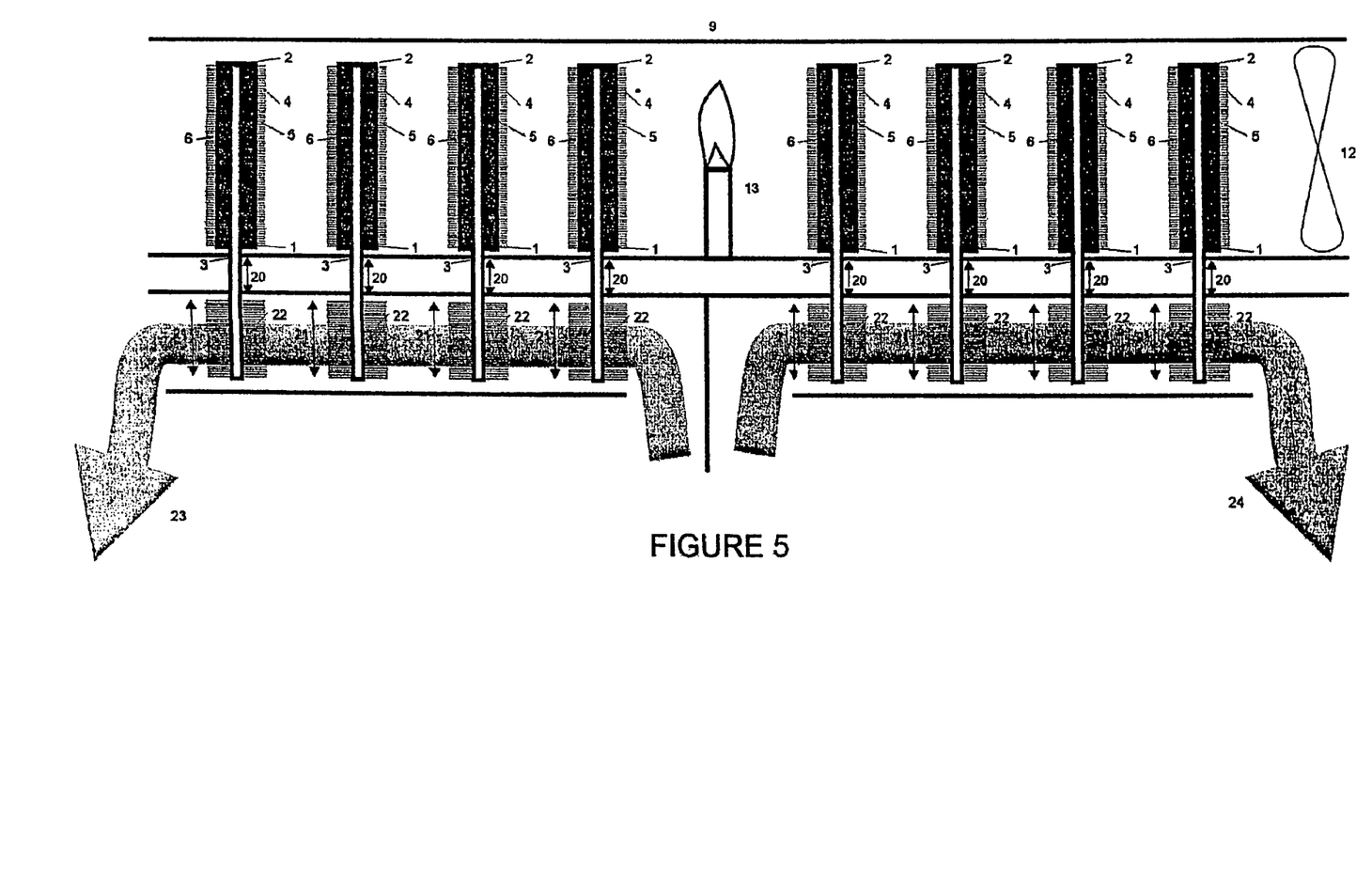
FIG. 5 illustrates schematically an embodiment of the sorption device of this invention, the device incorporating the sorption tubes as shown in FIG. 4.

Referring now to FIG. 5, there is shown a number of sorption tubes of the type illustrated in FIG. 4 arrayed within a sorption device. In this embodiment of the invention, the sorption tubes contain generator modules 7 which are again arranged in blocks 8 within two arrays 10, 11 separated by a heating zone 13. The generator modules 7 are all contained within the duct 9 which is filled with thermally conducting fluid which is driven by the reversible fan 12 (or pump or other fluid moving device). The arrays of generator modules 7 are heated and cooled by fluid flow within the duct 9, as described in relation to previous embodiments. The generator arrays 10, 11 are connected to a heat exchange system.

Each generator module 7 of this embodiment has its associated evaporator/condenser 21, to which it is connected and sealed. Accordingly, the sorption tubes comprise blocks 8 and arrays 10, 11 of generator modules 7 and of evaporator/condenser 21 regions. The heat exchange system comprises the two arrays of evaporator/condenser 21 regions which extend below the duct 9 into heat exchange passages which are thermally isolated both from the duct 9 and from each other. A first carrier fluid 23 flows through a first heat exchange passage in thermal contact with the evaporator/condenser regions 21 of the first array and a second carrier fluid 24 flows likewise through a second heat exchange passage containing tubes of the second array.

In FIG. 5, four rows of sorption tubes of the type shown in FIG. 4 are depicted to either side of the heating zone 13. The rows of sorption tubes extend into the page, and hence individual tubes within the rows are obscured within this view. Like the previous embodiments of the sorption device of this invention, any number of sorption tubes may be used in each row, and tens of rows may form each array. For ease of manufacture respective evaporator/condenser regions 21 may be linked within a row by fins 22, as may respective generator modules 7. This is not however necessary in this embodiment.

Consider the situation in which fluid (for example, ambient temperature air) is drawn through the duct 9 from left to right in the representation shown in FIG. 5. In the left hand bank of sorption tubes, the generator modules 7 will be cooling down and therefore in various stages of sorbate re-adsorption. Liquid sorbate in condenser/evaporator regions 21 of this bank will boil and cool the fluid 23 flowing through the first heat exchange passage. Fluid flow direction is not necessarily in the sense shown in the Figure. It could be in the reverse direction or transversely into or out of the plane of the diagram. The carrier fluid 23 itself could, in the case of an air conditioning system, simply be the air that requires cooling. At the same time, in the right hand bank of sorption tubes, the generator modules 7 will be in various stages of desorption. Gaseous sorbate in condenser/evaporator regions 21 of the bank will condense and heat the fluid 24 flowing through the second heat exchange passage. Again fluid 24 flow could be in any direction perpendicular to the orientation of sorption tubes. If the device is used as an air conditioner then the fluid 24 may be outside air that acts as a heat sink and is rejected.

At a predetermined time, the fan 12, and hence the direction of ambient fluid flow through generator duct 9, is reversed. The predetermined time may be set as when the temperature of the carrier fluid entering the first heat exchange passage 23 falls below a set value or, alternatively, when the temperature of fluid leaving the generator duct 9 exceeds a set value, or set by some other appropriate criterion. The left hand bank of generators 7 then enters the desorption phase and the right hand bank the adsorption phase. Carrier fluid 23 will now be heated and fluid 24 cooled. A mechanism (not shown) is provided in a known manner to divert either the flows or the fluids through the heat exchange passages such that cooling is always delivered to the region that needs cooling (in the case of an air conditioner, the conditioned space) and heat delivered as appropriate (in the case of an air conditioner, rejected to ambient).

This embodiment presents a number of advantages over the previously described embodiments of this invention. It avoids the requirement for one-way valves or an expansion valve by keeping all the generator modules unlinked. Check valves 14, 15, such as those used in the FIGS. 2 and 3 embodiments can, for example, become clogged with carbon dust and start leaking. Additional maintenance is therefore required when using a valve system and, particularly in relation to the FIG. 3 embodiment, replacement could prove expensive. Secondly, the mass of sorbate (refrigerant) in any individual tube is low; it may only need to be of the order of a few grams. In the event of a sorption tube rupturing or failing in some other way, the cooling (or heating) device as a whole will only suffer a marginal reduction in performance and any polluting or hazardous consequence of refrigerant loss is minimised.

Figure 6:
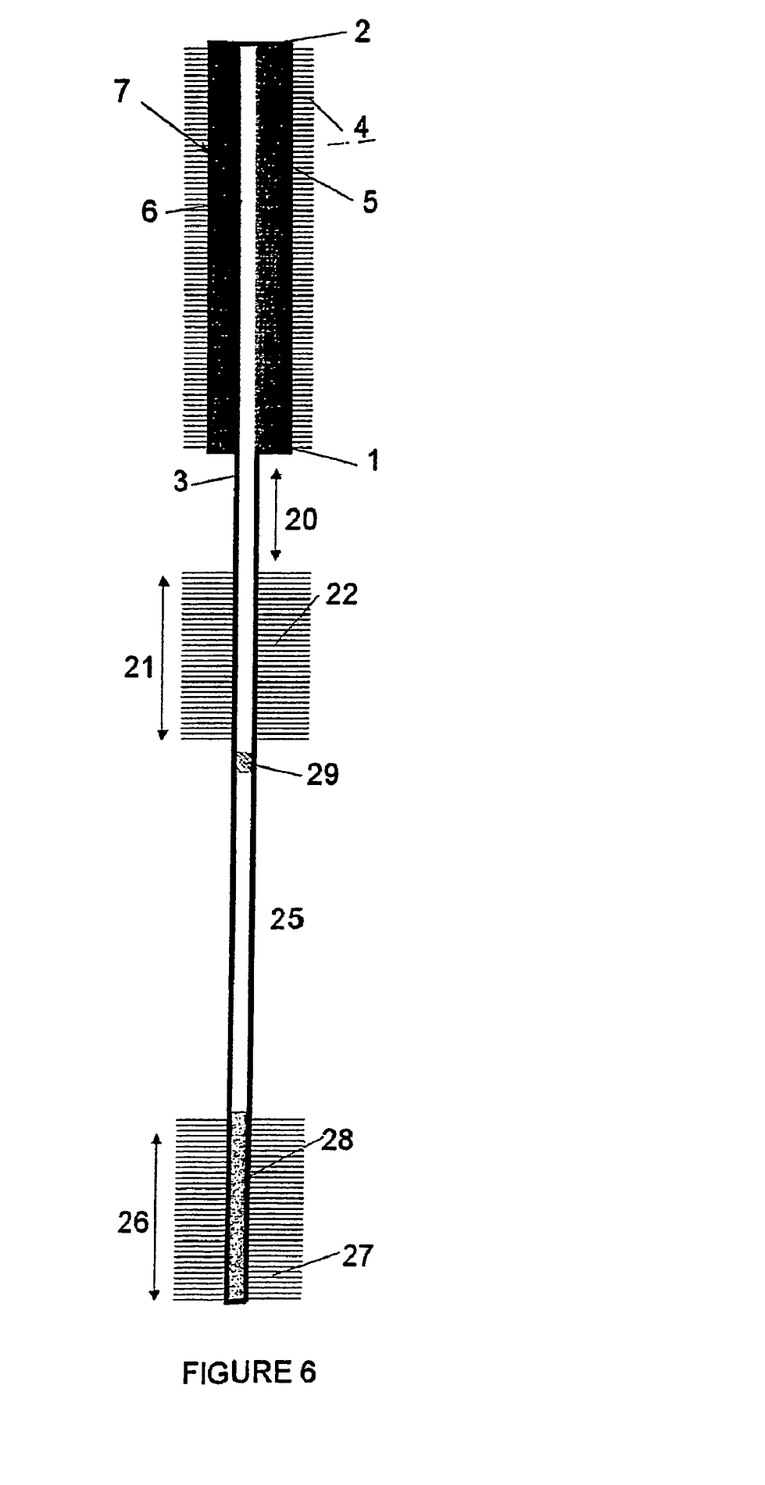
FIG. 6 illustrates a novel sorption tube incorporating the generator module of FIG. 1, in accordance with an alternative aspect of this invention.

An alternative aspect of this invention, as embodied in a novel design of sorption tube, is shown in FIG. 6. This design of sorption tube comprises three sections: a generator module 7, condenser module 21 and separated evaporator module 26.

The generator 7 and condenser 21 modules are identical to the generator 7 and condenser/evaporator 21 modules described in relation to FIG. 4. That is, the generator module 7 comprises a sorbent material 1 held within a container 2 having one or more passages 3 for connection via an adiabatic region 20 to the condenser module 21. As before, the sorbent 1 may be, for example, active carbon, zeolite, silica gel, metal halides, metal alloys or combinations thereof. Fins 4, 5 may, if required, be arranged internally 4 and/or externally 5 to the container 2 as an aid to heat transfer. The sorbent 1 is packed between the internal fins 4 or, if they are not required, against the generator wall. The sorbent 1/internal fin 4 arrangement does not extend completely across the container, but leaves a void to allow sorbate gas transport, such as a central cylindrical cavity 6. In an alternative arrangement the sorbent may take the form of crushed grains, possibly premixed with a "confetti" of aluminium foil. This provides a lower cost alternative to the tubular-shaped sorbent with central cavity. A refrigerant gas (sorbate) is present within the generator and in fluid communication, via the passage(s) 3, with the condenser module 21. The sorbate may be any substance that is absorbed or adsorbed by the sorbent, for example, ammonia, water, hydrogen, hydrocarbons, fluorohydrocarbons, carbon dioxide, etc. In this Figure, the condenser module 21 is also shown possessing external fins 22 to enhance heat transfer to a carrier fluid, although, in some applications, this may not be necessary.

In this embodiment of the invention, the sorption tube also includes the evaporator module 26 located below the condenser module 21 and connected to it via a second adiabatic region 25. This adiabatic region 25 has greater volume than the first 20 and, in addition to reducing thermal conduction between the condenser 21 and evaporator 26, it also acts as a receiver for liquid condensate which forms in the condenser 21 and then flows to the evaporator 26 under action of gravity. The evaporator 26 has (optionally) external fins 27, or other devices, that enhance heat transfer to an external carrier fluid flowing in thermal contact with the evaporator module 26. The fins 27 are shown as present in the Figure.

The sorption tube itself is hermetically sealed and, when ready for use, is charged with enough sorbate such that, even when the sorbent 1 contains its highest concentration of sorbate, a quantity 28 of liquid sorbate fills the evaporator module 26. The length and shape of the adiabatic section 25 is such that it avoids the possibility of liquid sorbate 28 splashing upwards into the condensing module 21.

Consider now evaporation/condensation of the sorbate contained within the sorption tube of FIG. 6 as the temperature of the generator module 7 is cycled. In the desorption phase, condensing occurs and heat is given out to the environment. At any stage of this process, it has been ensured that the evaporator module 26 will be filled with liquid 28. This prevents gaseous sorbate entering and condensing and so, by avoiding any wasteful heating through condensation, serves to keep the temperature of the evaporator module 26 relatively cold. Accordingly, condensation is constrained to occur in the relatively warm condensing module 21. The heat of condensation is removed by surrounding fluid (not shown) and the resulting liquid condensate falls under gravity and accumulates in the adiabatic region 25. In the adsorption/evaporation phase, boiling occurs from the liquid condensate 28 in the evaporator 26 or base of the adiabatic region 25. The resulting vapour bubbles rise through the liquid 28, separate from it and pass through the condensing module 21 and back to the generator module 7. Clearly any liquid splashing into the condensing section 21 and evaporating there would unnecessarily cool this region 21 and reduce performance. With this design of sorption tube therefore, it is ensured that environmental cooling predominately occurs around the evaporator module 26 and environmental heating around the condensing module 21.

Figure 7A:
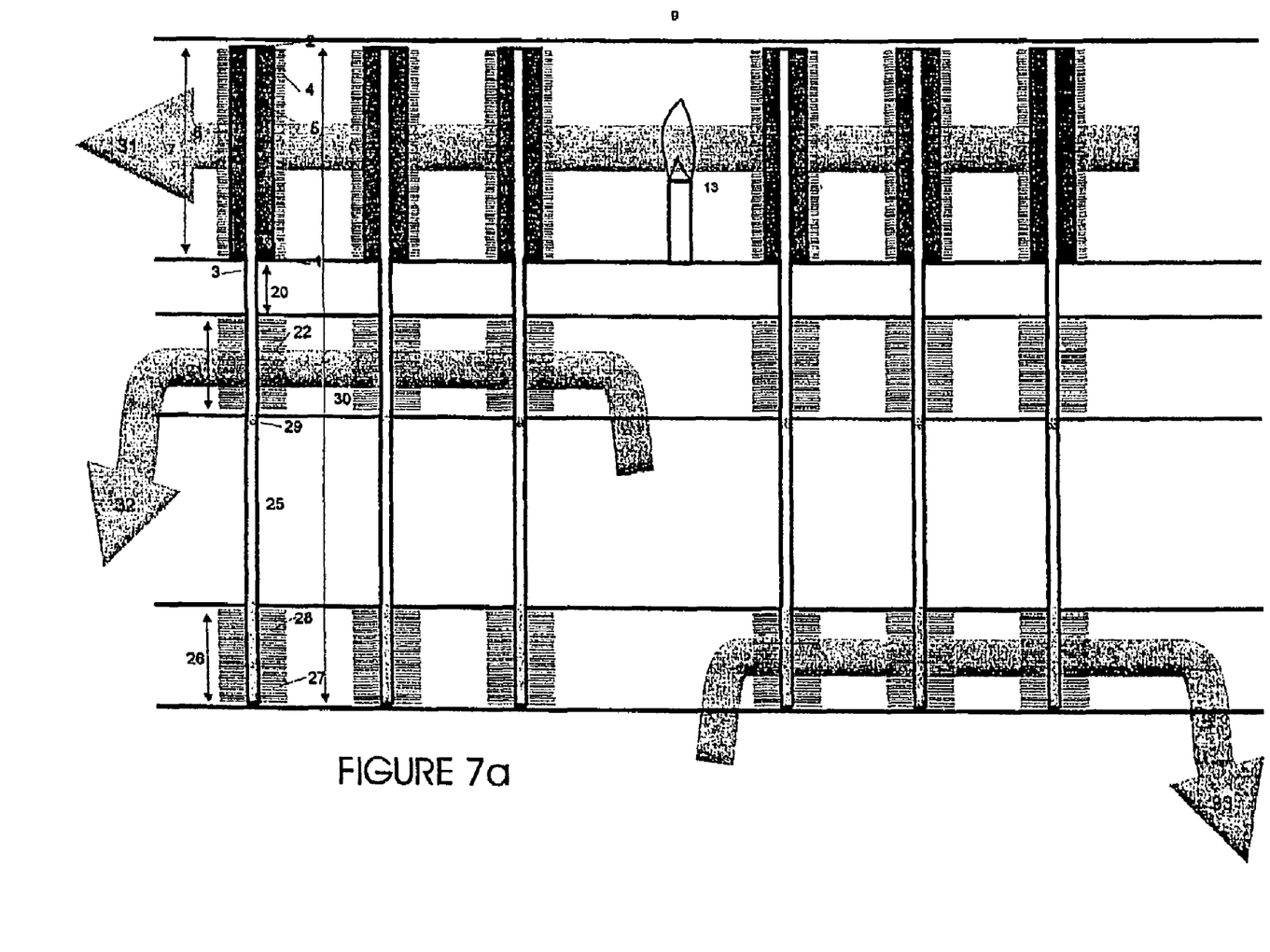
FIG. 7a illustrates schematically an embodiment of the sorption device of this Invention during a first phase of its operating cycle, the device incorporating the novel sorption tubes of FIG. 6.
Figure 7B:
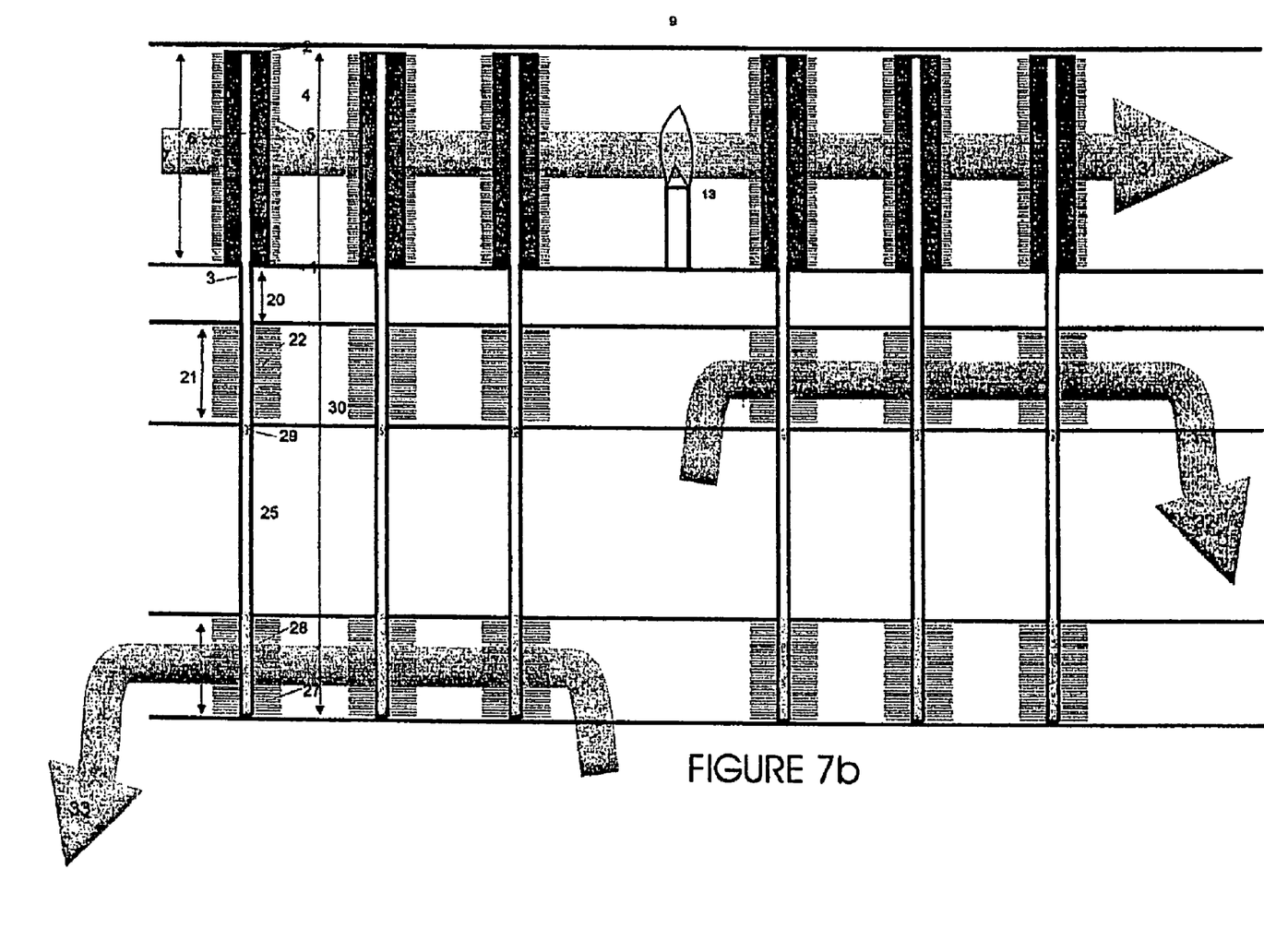
FIG. 7b shows the sorption device of FIG. 7a, this time during a second phase of its operating cycle.

FIGS. 7a and 7b show a number of novel sorption tubes of the type illustrated in FIG. 6 arrayed within a sorption device. The arrangement of sorption tubes in these Figures is similar to that illustrated in FIG. 5. The sorption tubes contain generator modules 7 which are, as before, arranged in blocks 8 within two arrays 10, 11 separated by a heating zone 13. The generator modules 7 are all contained within the duct 9, which is filled with thermally conducting fluid that is driven by the reversible fan (not shown in these Figures). The arrays 10, 11 of generator modules are heated and cooled by fluid flow within the duct 9, as described in relation to previous embodiments of the sorption devices in accordance with the second aspect of this invention. The generator arrays 10, 11 are connected to a heat exchange system.

The heat exchange system of the embodiment shown in FIGS. 7a and 7b differs from that shown in FIG. 5 as a result of the different design of sorption tube. Each generator module 7 of this embodiment is connected to its associated condenser module 21, which in turn is connected to an associated evaporator module 26. Each associated generator 7, condenser 21 and evaporator 26 are hermetically sealed, as shown more clearly in FIG. 6. Accordingly, the sorption tubes are arranged in respective blocks 8 and arrays 10, 11 of generator modules 7, of condenser modules 21 and of evaporator modules 26. The heat exchange system comprises the two arrays of condenser 21 regions, extending below the duct 9 into a first heat exchange passage, and the two arrays of evaporator 26 regions, extending below the first heat exchange passage to a second heat exchange passage. Both heat exchange passages are thermally isolated both from the duct 9 and from each other. Heat carrier fluid may be passed in streams 31, 32, 33 through the duct 9 and both heat exchange passages.

As in FIG. 5, the rows of sorption tubes extend into the page of FIGS. 7a and 7b, and hence individual tubes within the rows are obscured from view. Again, any number of sorption tubes may be used in each row and tens of rows may form each array. Respective condenser regions 21 and respective evaporator regions 26 may be linked within a row by fins 22, 27, as may respective generator modules 7.

FIG. 7a Illustrates a first phase of the operating cycle of the embodiment shown. In this phase, fluid is drawn through the duct 9 in a stream 31 running from right to left in the representation shown. The stream 31 is heated in the central heating zone 13. The fluid used may be, for example, oil or air. In the latter case, the heating zone 13 may facilitate heating simply by direct mixing of hot exhaust gas with the air. At the same time, heat carrier fluid 32 to be heated is drawn into the first heat exchange passage at a position between the two arrays of condenser regions 21 and then through the left hand bank of sorption tubes. Heat carrier fluid 33 to be cooled is drawn into the second heat exchange passage again at a position intermediate the two evaporator arrays 26, but to an exit through the right hand bank of sorption tubes.

As the fluid 31 is drawn through duct 9, the generator modules 7 in the right hand bank of sorption tubes will be cooling down and therefore in various stages of sorbate re-adsorption. Liquid sorbate in the evaporator regions 26 of this bank will boil and cool the fluid 33 flowing through the second heat exchange passage. Fluid flow direction through this second heat exchange passage is not necessarily in the sense shown in the Figure. It could be in the reverse direction or transversely into or out of the plane of the diagram, or even additionally through the evaporator modules within the left hand bank. The carrier fluid 33 itself could, in the case of an air conditioning system, simply be the air that requires cooling. Alternatively, it could be water. At the same time, in the left hand bank of sorption tubes, the generator modules 7 will be in various stages of desorption. Gaseous sorbate in the condenser regions 21 of the bank will condense and heat the fluid 32 flowing through the first heat exchange passage. Again fluid 32 flow could be in any direction, although perpendicular to the orientation of sorption tubes is preferred. If the device is used as an air conditioner then the fluid 32 may be outside air that acts as a heat sink and is rejected.

At a predetermined time, the direction of ambient fluid flow 31 through generator duct 9, is reversed. The predetermined time may be set as when the temperature of fluid leaving the generator duct 9 exceeds a set value, or by some other appropriate criterion. This phase of the operating cycle is illustrated in FIG. 7b. The right hand bank of generators 7 then enters the desorption phase and the left hand bank the adsorption phase. A mechanism (not shown) is provided in a known manner to divert the direction of fluid flow 32, 33 through the heat exchange system. The heat carrier fluid 32 to be heated is drawn into the first heat exchange passage as before but now exits through the right hand bank of sorption tubes. Heat carrier fluid 33 to be cooled is drawn into the second heat exchange passage again as before but now exits through the left hand bank of sorption tubes. In either phase, the cooled fluid 33 is then delivered to the region that needs cooling (in the case of an air conditioner, the conditioned space) and heated fluid 32 delivered as appropriate (in the case of an air conditioner, rejected to ambient).

A first advantage offered by the design of sorption tube shown in FIGS. 6, 7a and 7b is that, by ensuring cooling and heating take place at physically separate locations, carrier fluids (32 and 33 in FIGS. 7a, 7b) no longer need to be diverted to the same degree, or even at all, as the phase of the sorption/desorption cycle changes. Rather, similar to the devices shown in FIGS. 2 and 3, the fluid needing cooling can be continually passed through the evaporator section 26, or that needing heating through the condenser section 21. Because the phases cycle however, i.e. continuous cooling cannot be produced at the evaporator 26 and continuous heating at the condenser 21, it will reduce the work required for fluid pumping if fluid is only passed over the condensing sections 21 when their tubes are in the condensing phase and over the evaporating sections 26 when their tubes are in the evaporating phase, as shown. Each bank therefore alternately provides the required cooling (or heating) as the phase of the sorption cycle is changed (FIG. 7a of FIG. 7b).

A second advantage to be gained by the use of these novel sorption tubes is also related to the fact that, by ensuring that the evaporator module 26 remains filled with liquid sorbate, condensing and evaporating are constrained to occur in physically separate condenser 21 and evaporator 26 modules. This physical separation means that the evaporator module 26 is kept relatively colder that the condenser module 21, which reduces the extent of the thermal cycling that each has to go through. By way of contrast, in the (prior art) sorption tube shown in FIG. 4, the temperature of the condensing/evaporating region 21 is continually cycled as the environment is heated during a condensing (or desorption) phase and cooled during an evaporation (or re-adsorption) phase. The thermal mass of the containing vessel in the condensing/evaporating 21 region and that of the fins 22 must be alternately heated and cooled. This is very wasteful in terms of useable output and the efficiency loss is significant. Removal of the fins 22 would reduce thermal mass, but hinder the speed and efficiency of heat exchange. By having separate condensing 21 and evaporating 26 regions, as shown in FIGS. 6, 7a and 7b, each can be kept at a different average temperature and the degree of thermal cycling is very much reduced. The walls of the adiabatic section 25 of FIG. 6 will clearly experience some thermal cycling, being subjected alternately to warm condensate leaving the condenser 21 and to cold gas leaving the evaporator 26. The thermal mass of this section 25 can however be minimised. Moreover, some of this apparent loss is regenerated to a degree. The cooling of the walls of the adiabatic section 25 by cold sorbate gas exiting the evaporator 26 will later result in a cooler liquid sorbate within that section 25, thermal change in this case being in the desired direction.

A further embodiment of the sorption tube shown in FIG. 6 is provided by insertion of a material such as inert granules or mesh 29 in the adiabatic section 25. This both decreases the possibility of liquid sorbate splashing upwards and increases the cooling effect of exiting vapour on subsequently-entering warm liquid condensate.

Although the sorption tubes described herein all employ solid sorbent materials 1, the concepts described herein may also be applied to liquid sorbents. Several means are available with which to prevent liquid sorbent from falling down the tube from the generator module 7 and into the condensing 21 or evaporating 26 sections. For example, in the embodiments of the sorption device shown in FIGS. 2 and 3, the manifolds 8, 19 may be connected at the tops of the generator modules 7, rather than the bases. In the sorption tubes shown in FIGS. 4 and 6, the first adiabatic section 20 may be connected from the top of the container 2, whilst keeping condenser or condenser/evaporator 21 in its relative position below the generator module 7. Alternatively, the passage 3 may be extended within the container 2, such that its mouth is positioned near the top. All of these arrangements allow desorbed gas to diffuse out of the generator module, whilst holding the liquid sorbent within. Suitable sorbent/sorbate systems include lithium bromide as a sorbent and water as the sorbate/refrigerant.

The invention claimed is:

1. A sorption tube comprising a generator section connected via a first passage to a condenser section, wherein the tube contains a sorbent material within its generator section and a quantity of sorbate fluid, wherein the condenser section is connected by a second passage to an evaporator section, the generator, condenser, and evaporator sections being so arranged or interlinked such that liquid in the condenser section is encouraged to flow to the evaporator section and discouraged from flowing to the generator section and the quantity of sorbate fluid and pressure within the tube is such that, when the sorbent material is saturated with adsorbed or absorbed sorbate and at its lowest anticipated operating temperature, the evaporator section is substantially filled with sorbate liquid.

2. The sorption tube of claim 1, wherein the evaporator section is located below the condenser section and the second passage is downwardly extending whereby liquid in the condenser section is encouraged to flow into the evaporator section under action of gravity.

3. The sorption tube of claim 1, wherein the first and second passages comprise adiabatic sections.

4. The sorption tube of claim 1, wherein the condenser and/or evaporator sections have a surrounding arrangement of heat-conducting fins.

5. The sorption tube of claim 1, wherein the generator section has an external arrangement of heat-conducting fins.

6. The sorption tube of claim 1, wherein the generator section has an internal arrangement of heat-conducting fins with one or more voids sufficient to permit gas transport therebetween.

7. The sorption tube of claim 6, wherein the sorbent material is solid and packed between the internal fins.

8. The sorption tube of claim 6, wherein the sorbent material is liquid and the first passage extends upwardly within the sorbent tube, its opening being located above the uppermost level of liquid sorbent.

9. The sorption tube of claim 1, wherein the sorbent material is chosen from one of the group of active carbons, zeolites, silica gets, metal halides, metal alloys, water or a combination thereof.

10. The sorption tube of claim 9, wherein the sorbate fluid is chosen from one of the group of ammonia, water, alcohols, hydrogen, hydrocarbons, hydrofluorocarbons and carbon dioxide.

11. The sorption tube of claim 1, further comprising a porous plug of inert material within the second passage.

12. The sorption tube of claim 1, wherein the evaporator section of the tube directly connects to the condenser section of the tube without separation by a valve.

* * * * *

UNITED STATES PATENT AND TRADEMARK OFFICE
CERTIFICATE OF CORRECTION

PATENT NO. : 7,578,143 B2 Page 1 of 1
APPLICATION NO. : 10/522030
DATED : August 25, 2009
INVENTOR(S) : Critoph et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1098 days.

Signed and Sealed this

Seventh Day of September, 2010

David J. Kappos
*Director of the United States Patent and Trademark Office*